US006337097B1

United States Patent
Sun et al.

(10) Patent No.: US 6,337,097 B1
(45) Date of Patent: Jan. 8, 2002

(54) BIODEGRADABLE AND EDIBLE FEED PACKAGING MATERIALS

(75) Inventors: Xiuzhi S. Sun; Paul Seib; Greggory S. Karr, all of Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 0 days.

(21) Appl. No.: 09/408,373

(22) Filed: Sep. 29, 1999

(51) Int. Cl.[7] .................. B32B 23/04; B32B 23/18; B65D 85/00
(52) U.S. Cl. .............. 426/102; 426/138; 426/622; 426/636; 426/452; 428/35.6; 428/292.1
(58) Field of Search .................. 426/138, 89, 94, 426/390, 391, 512, 394, 102, 636, 622, 452; 428/35.6, 292.1, 326, 532, 15, 17

(56) References Cited

U.S. PATENT DOCUMENTS

| | | | | |
|---|---|---|---|---|
| 1,425,335 A | * | 8/1922 | Peterson ............. 229/125.35 |
| 5,756,024 A | * | 8/1922 | Huang .................. 264/113 |
| 3,775,144 A | * | 11/1973 | Ware et al. ............. 106/15.05 |
| 3,836,376 A | | 9/1974 | Hampton et al. ........ 106/214.2 |
| 4,076,846 A | * | 2/1978 | Nakatsuka et al. ........... 426/62 |
| 4,221,818 A | * | 9/1980 | Schroeder ................ 426/138 |
| 4,579,944 A | * | 4/1986 | Harvey et al. ............. 536/102 |
| 4,731,249 A | | 3/1988 | Findley ................... 426/69 |
| 4,904,486 A | | 2/1990 | Donovan et al. ............. 426/69 |
| 5,160,368 A | | 11/1992 | Begovich ................ 106/126.2 |
| 5,346,710 A | | 9/1994 | Geitner .................... 426/115 |
| 5,354,621 A | * | 10/1994 | Liebermann ............... 428/532 |
| 5,411,691 A | * | 5/1995 | Hwang .................... 264/115 |
| 5,593,625 A | | 1/1997 | Riebel et al. .............. 264/115 |
| 5,611,882 A | | 3/1997 | Riebel et al. ............ 156/272.2 |
| 5,622,739 A | | 4/1997 | Benton et al. ............... 426/74 |
| 5,635,123 A | | 6/1997 | Riebel et al. .............. 264/125 |
| 5,658,624 A | * | 8/1997 | Anderson et al. .......... 428/34.7 |
| 5,688,448 A | * | 11/1997 | Shutov et al. ............... 264/54 |

* cited by examiner

*Primary Examiner*—Nina Bhat
(74) *Attorney, Agent, or Firm*—Hovey, Williams, Timmons & Collins

(57) ABSTRACT

Biodegradable and edible composites for use as feed packaging containers are provided. Broadly, the composites are formed from a mixture comprising fiber mixed with a non-petroleum based, biodegradable adhesive formed by modifying a starch, protein, or protein-rich flour. The mixture has a moisture content of less than about 20% by weight, based upon the total weight of the mixture taken as 100% by weight. The mixture is then molded at pressures of from about 150–600 psi and temperatures of from about 150–500° F. to yield a final composite having a compressive strength of at least about 5 MPa. Preferred fibers include those derived from straw, corn stalks, sorghum stalks, soybean hulls, and peanut hulls. Preferred modifiers include NaOH, urea sodium dodecyl sulfate, sodium dodecylbenzene sulfonate, and guanidine hydrochloride.

22 Claims, 1 Drawing Sheet

BIODEGRADABLE AND EDIBLE FEED PACKAGING MATERIALS

BACKGROUND OF THE INVENTION

1. Field of the Invention

The present invention is broadly concerned with biodegradable and edible packaging composites or containers comprising self-sustaining bodies and formed from a mixture comprising a non-petroleum based, biodegradable adhesive and a quantity of fiber. More particularly, the containers comprise a fiber derived from a fiber source selected from the group consisting of straw (e.g., wheat, rice, barley), corn stalks, sorghum stalks, soybean hulls, peanut hulls or any other fibers derived from grain milling by-products), and mixtures thereof. The adhesive can be protein-based or starch-based, and is preferably formed by modifying a protein, starch, or protein-rich flour with a modifier comprising alkaline materials and/or modifiers having particular functional groups. The resulting mixture has a low moisture content and is molded at high temperatures and pressures to yield a final container having high compressive strengths.

2. Description of the Prior Art

Livestock gel blocks are currently utilized for supplementing the diets of sheep, horses, and cattle in both feedlot and open grazing conditions. The blocks are formed of gels which are flowable at a temperature of about 80° C. These gels are poured into a container and become rigid upon cooling. The gel blocks have "cold flow properties" meaning that, although they appear to be a solid, the blocks will not retain their shape when subjected to stress (such as from the weight of other blocks or gravity). As a result, the gel blocks are not free-standing and must be in a container at all times. The gels turn into a thick syrup upon absorbing moisture from the air. This syrup is then consumed by the livestock.

Currently available containers for use with gel blocks include half steel drums, plastic tubs, and paper or cardboard containers. Each of these containers has undesirable properties. For example, the steel drums must be either thrown away or recycled after use. Recycling is generally preferred in order to minimize the quantity of waste in landfills and other disposal sites. However, recycling involves additional labor and expense as the drums must be collected and transported back to the feed manufacturer and then reconditioned (i.e., reshaped, cleaned, and sterilized) by the manufacturer before reusing the drum. Likewise, plastic tubs can be discarded or recycled but must undergo the same labor and expense involved in recycling steel drums. Furthermore, the plastic tubs result in the generation of plastic waste which presents a disposal problem for the consumer as well as a liability problem for the manufacturer.

Paper and cardboard containers have been attempted commercially as an alternative to plastic or steel. However, paper and cardboard containers do not perform adequately. One problem with paper and cardboard containers is that they are permeable to moisture at room conditions, thus allowing moisture to contact the gel. This causes the gel to turn into a syrup prematurely which then seeps through the container, making the products difficult to ship and store. Furthermore, these paper and cardboard containers do not easily biodegrade, leaving waste at the feeding site. Finally, the livestock may consume portions of these paper or cardboard containers, presenting a possible danger to the livestock if the paper or card-board is not processed following FDA standards.

U.S. Pat. No. 5,160,368 to Begovich discloses a biodegradable package for fast food comprising a body which is molded from a composition consisting essentially of an admixture of biodegradable natural materials comprising low-protein flour (i.e., about 10–15% by weight protein in the flour) or meal from edible gramineous plants (e.g., corn or sorghum), crushed hay of gramineous plants (e.g., wheat, sorghum, corn, or corncob leaves), apreservative, and aplasticizing agent. However, the '368 package has a high moisture content prior to molding (about 50% by weight moisture), thus resulting in a container that often cracks when molded at the high temperatures and pressures necessary to obtain a strong container. Furthermore, the '368 patent fails to use a strong adhesive which results in a package having inadequate mechanical properties for use in packaging of livestock feed gel blocks (which often weigh 250 lbs. each) and other applications which require a strong container.

There is a need for biodegradable and edible packaging containers which do not contain cracks or other defects and which have strong mechanical properties, allowing the container to be subjected to stress with little risk of failing.

SUMMARY OF THE INVENTION

The instant invention meets this need by providing biodegradable and edible composites having high compressive strengths. Broadly, the composites are in the form of a self-sustaining body formed from a mixture comprising a non-petroleum based, biodegradable adhesive and a quantity of fiber. These composites can be used as containers for livestock gel blocks as well as other applications such as flower and plant containers.

In more detail, the fiber utilized in the inventive composites is derived from a fiber source selected from the group consisting of straw (including wheat, rice, and barley), corn stalks, sorghum stalks, soybean hulls, peanut hulls, and mixtures thereof.

While most non-petroleum based, biodegradable adhesives which are capable of forming the high strength composites of the invention are suitable, it is preferred that the adhesive be formed by modifying a starch (e.g., cereal starch and legume starch), protein, protein-rich flour (i.e., soy flour or other flour having at least about 25% by weight protein, and preferably at least about 40% by weight protein), or mixtures thereof with a modifier selected from the group consisting of:

(1) alkaline materials (such as NaOH);
(2) saturated and unsaturated alkali metal $C_8$–$C_{22}$ (and preferably $C_{10}$–$C_{18}$) sulfate and sulfonate salts;
(3) compounds having the formula I:

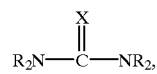

wherein each R is individually selected from the group consisting of H and $C_1$–$C_4$ saturated and unsaturated groups, and X is selected from the group consisting of O, NH, and S; and (4) mixture of (1), (2), and (3).

The $C_1$–$C_4$ saturated and unsaturated groups refer to alkyl groups (both straight and branched chain) and unsaturated refers to alkenyl and alkynyl groups (both straight and branched chain). Preferred compounds having the formula I are urea and guanidine hydrochloride. When urea is the modifier, the protein, starch, or protein-rich flour is preferably essentially free of urease, having less than about 10 activity units of urease. Alternately, a urease inhibitor can be added to the protein, starch, or protein-rich flour.

Saturated alkali metal $C_8$–$C_{22}$ sulfate and sulfonate salts include all alkali metal alkyl (such as octyl and dodecyl) $C_8$–$C_{22}$ sulfate and sulfonate salts. Unsaturated alkali metal $C_8$–$C_{22}$ sulfate and sulfonate salts include all alkali metal alkenyl (such as decenyl and octadecenyl) $C_8$–$C_{22}$ sulfate and sulfonate salts and all alkali metal alkynyl (such as octynyl and tetradecynyl) $C_8$–$C_{22}$ sulfate and sulfonate salts. Two particularly preferred modifiers in this class are sodium dodecyl sulfate (SDS) and sodium dodecylbenzene sulfonate (SDBS).

The adhesives are prepared by simply forming an aqueous slurry or dispersion of modifier and starch, protein, or protein-rich flour. This modifier slurry is mixed for about 1–400 minutes at a temperature of from about 15–70° C. Preferably, the forming and mixing of the dispersion takes place under ambient temperature and pressure conditions.

The resulting adhesive is then mixed with a quantity of fiber. Preferably the particle size of the fiber is such that less than about 10% of the particles have a particle size of less than about 678 μm. The fiber and non-petroleum based adhesive should be utilized in appropriate quantities so that the mixture and final composite or container comprises from about 5–20% by weight adhesive solids (i.e., all solid components in the adhesive on a dry basis), and preferably from about 10–16.7% by weight adhesive solids, based upon the total weight of the mixture or final composite taken as 100% by weight. The mixture and final composite or container preferably comprises at least about 70% by weight fiber solids, and preferably from about 80–95% by weight fiber solids, based upon the total weight of the mixture or final composite taken as 100% by weight. The ratio of fiber solids to adhesive solids should be from about 2.5:1 to about 20:1, preferably from about 4:1 to about 15:1, and more preferably from about 5:1 to about 9:1.

The formed mixture is then dried to a moisture content of less than about 20% by weight, preferably from about 5–15% by weight, and more preferably about 11–13% by weight, based upon the total weight of the mixture taken as 100% by weight. It is preferred that no preservatives be added to this mixture so that the final composite is essentially free of preservatives. In one embodiment, the mixture consists essentially of a non-petroleum based, biodegradable adhesive and a quantity of fiber.

When a protein or protein-rich flour is modified to form the biodegradable adhesives utilized in preparing the composites of the invention, the protein or protein-rich flour should be included in sufficient quantities so that the concentration of protein in the mixture (i.e., the fiber mixed with the aqueous dispersion after drying) is at least about 5% by weight, preferably at least about 7% by weight, and more preferably at least about 9% by weight, based upon the total weight of the mixture taken as 100% by weight. Suitable proteins for forming the adhesives include those selected from the group consisting of soybean protein, wheat protein, corn protein, sorghum protein, and mixtures thereof The dried mixture is then molded into a package having the preferred shape for the particular application. Molding is carried out by subjecting the shaped mixture to molding temperatures of from about 150–500° F., and preferably from about 200–350° F., and molding pressures of from about 150–600 psi, and preferably from about 220–450 psi. The molding process should be carried out for a time period of from about 1–20 minutes, and preferably from about 3–8 minutes. Molding can be carried out on any conventional molding presses known in the art, so long as the press is able to accommodate the foregoing temperature and pressure conditions. Furthermore, the mixture can be molded into virtually any shape, depending on the particular application. Preferred shapes for use in livestock feed supplements include box-shaped and half-barrel-shaped containers.

The final, molded composite or container should have a moisture content of less than about 10% by weight, and preferably less than about 5% by weight, based upon the total weight of the composite or container taken as 100% by weight. The final composite or container should have an ASTM D1037-93 compressive strength of at least about 5 MPa, preferably at least about 8 MPa, and more preferably at least about 10 MPa. Furthermore, the biodegradable composite or container should be essentially decomposable within about 1 year of being placed in the environment, depending upon its exposure to moisture and/or light. Finally, a moisture barrier (such as an FDA food grade wax) can be applied to the surfaces of the formed composite so as to minimize moisture absorption by the composite.

DETAILED DESCRIPTION OF THE PREFERRED EMBODIMENTS

EXAMPLES

Figure 1:
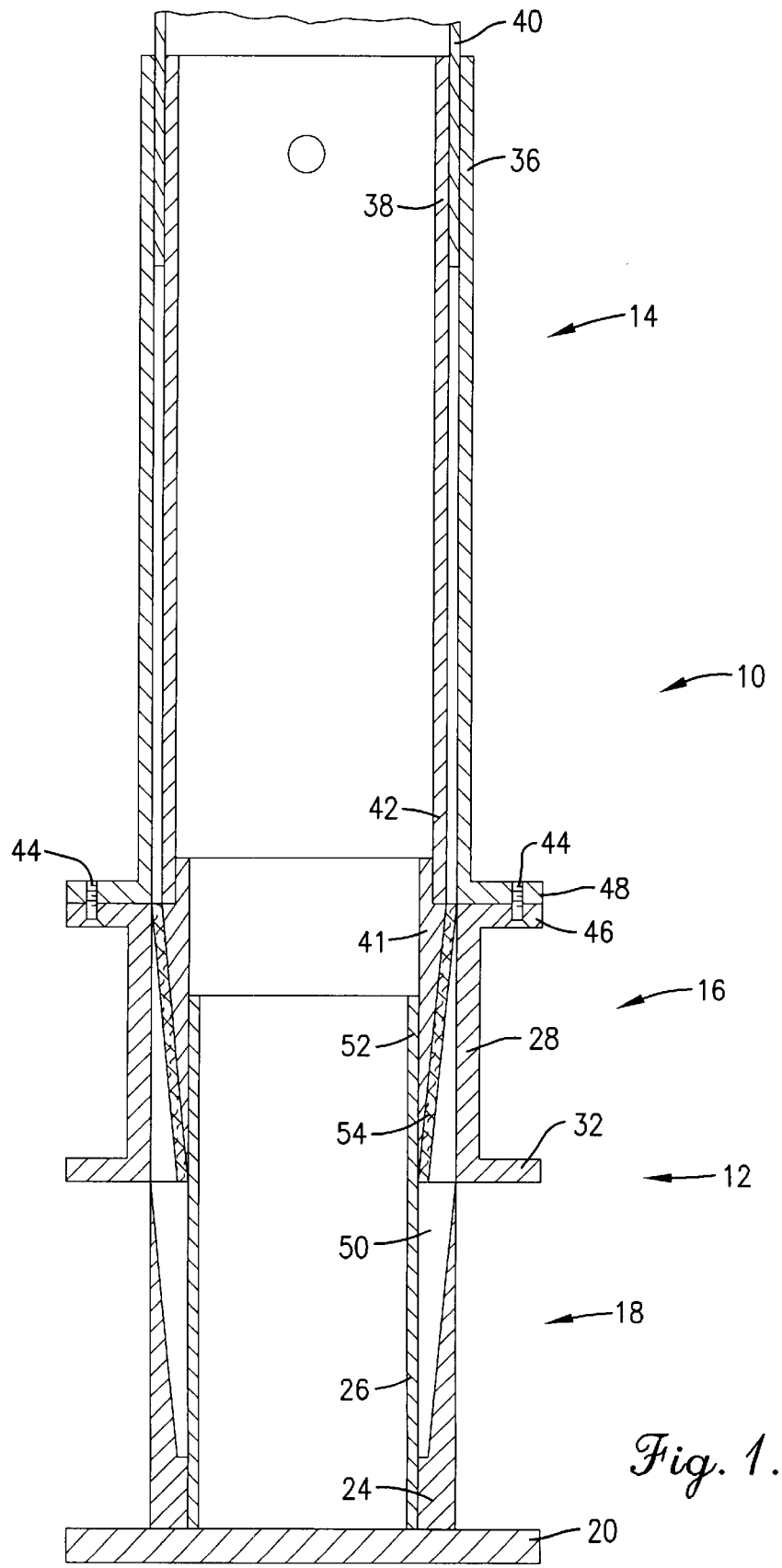
FIG. 1 illustrates the laboratory molding apparatus utilized to form the biodegradable and edible barrel in Example 3 from the mixtures of the invention.

The following examples set forth preferred methods in accordance with the invention. It is to be understood, however, that these examples are provided by way of illustration and nothing therein should be taken as a limitation upon the overall scope of the invention.

Example 1

1. Preparation of Sample Boards

In this example, 38 g of soybean flour was mixed with 200 ml of distilled water until the flour was uniformly dispersed in the water. Next, about 2 g of NaOH was added to the resulting water/flour mixture, and the adhesive was allowed to develop for a few minutes. About 300 g of ground wheat straw (obtained from Natural Fiber Board, Minneapolis, Kans.) was uniformly mixed with the developed soy flour-based adhesive, followed by drying of the resulting mixture. The final mixture had a soy flour content of about 10% by weight, based upon the total weight of the mixture taken as 100% by weight. Next, about 120 g of the dried mixture was compressively molded into 6" by 6" flat boards at 388 psi pressure and 140° C. for about 6 minutes. The above procedure was repeated with wheat gluten proteins. Finally, a biodegradable/edible wax was applied to the composite boards to form a moisture barrier around the boards. No solvents or thinners were necessary as the melted wax was in the form of a liquid-like solution.

2. Quality Evaluation of Boards a. Mechanical Property Tests

The boards prepared in Part 1 above were subjected to several tests to determine their various mechanical properties. The boards were cut into samples for the mechanical property testing using an Instron 1120 with crosshead speed of 2.54 mm/min. A 3-point bending test was performed on the flat board specimens to obtain several properties, including the modulus of rupture (MOR) and the modulus of elasticity (MOE). All specimen boards were pre-conditioned (maintained at 65% RH, 72–73° F. for at least two days) before the respective tests and the ASTM testing standard methods (ASTM D1037-93 for compressive strength and tensile strength of the boards) were followed. Each test was replicated at least three times.

b. Stability Test

A humidity incubation test was carried out on the boards prepared in Part 1 in order to determine the environmental stability of the boards. The board samples were preconditioned in 30% relative humidity (RH) at 27° C. for 1 week, followed by incubation in 90% RH for 1 week, after which the tests were conducted. Linear expansion, thickness swell, and weight gain were the properties measured on the straw board samples. Two replicates of the test were carried out.

3. Results and Discussion

Table 1 shows the maximum rupture strength and elasticity of the straw board specimens with different protein concentrations. The strengths of each of the composite samples were quite similar. The wheat gluten from Midwest Grain gave a slightly higher MOE than the gluten from Heartland Wheat Growers (Russell, Kans.).

TABLE 1

Bending strength of the straw fiber-based composites with natural binders.

| Sample | MOR (MPa) max. ±3 | MOE (MPa) max. ±460 |
|---|---|---|
| 14% soy flour | 8 | 1274 |
| 10% soy flour | 7 | 1179 |
| 10% gluten (Heartland Wheat Growers) | 6 | 1045 |
| 10% MW gluten (Midwest Grain) | 8 | 1560 |

Table 2 sets forth the dimension stability of the straw board specimens. After 1 week at 90% RH at 27° C., the swelling in thickness ranged from about 27% to about 40% for the three different composites. The swelling of the soy flour composites and gluten composites were similar to one another, and the 14% soy flour composites had the least swelling in thickness. All three composites had similar linear expansion and weight gain.

TABLE 2

Dimension stability of the straw fiber-based composite with natural binders after 1 week incubation at 90% RH and 27° C.

| Samples | Thickness swell % | Linear expansion % | Weight gain % |
|---|---|---|---|
| 14% soy flour | 28.09 | 0.93 | 15.4 |
| 10% soy flour | 40.04 | 1.11 | 15.78 |
| 10% gluten | 37.29 | 1.06 | 15.00 |

Example 2

1. Effect of Molding Pressure on Mechanical Properties of Samples

In this example, boards were prepared as described in Example 1 except that the mixture was dried to a 10% by weight moisture content prior to pressing. Each board was pressed at a molding temperature of 250° F., but the molding pressures and times were varied to determine the effect of molding pressures and times on the compressive strengths and tensile strengths of the boards. Those results are reported in Tables 3 and 4.

TABLE 3

Tensile strength of the composites with 10% moisture content as affected by molding pressure at 250° F.

| | Pressure (psi) | 56 | 167 | 220 | 330 | 440 |
|---|---|---|---|---|---|---|
| Tensile Strength (MPa) | For 4 minutes | 0.5 | 1.6 | 3.4 | 4.7 | 6.8 |
| | For 8 minutes | 0.5 | 1.8 | 4.0 | 7.1 | 7.6 |

TABLE 4

Compressive strength of the composites with 10% moisture content as affected by molding presszure at 250° F.

| | Pressure (psi) | 56 | 167 | 220 | 330 | 440 |
|---|---|---|---|---|---|---|
| Compressive Strength (MPa) | For 4 minutes | 1.6 | 3.6 | 13.6 | 14 | 18 |
| | For 8 minutes | 1.0 | 5.0 | 10.4 | 13.6 | 28.5 |

2. Effects of Moisture Content on Mechanical Properties of Samples

In this example, boards were prepared as described in Example 1 except the drying times of the boards were varied so as to yield boards of varying moisture contents. The boards were then molded at various molding temperatures and pressuresto determine the effect of moisture content, molding pressure, and molding temperature on the mechanical properties of the boards. These results are reported in Tables 5 and 6.

TABLE 5

Tensile strength of the composite as affected by moisture content and molding pressure.

| Moisture content % | 10 | 15 | 20 | 30 | 38 |
|---|---|---|---|---|---|
| Tensile Strength (MPa) | | | | | |
| at 220° F. for 4 min: | | | | | |
| at molding pressure 220 psi | — | — | — | — | — |
| at 250° F. for 8 min: | | | | | |
| at molding pressure 220 psi | 4.0 | — | crack | — | — |
| at molding pressure 55 psi | — | — | — | — | — |
| at 320° F. for 4 min: | | | | | |
| at molding pressure 220 psi | — | — | crack | — | — |

TABLE 6

Compressive strength of the composite as affected by moisture content and molding pressure.

| Moisture content % | 10 | 15 | 20 | 30 | 38 |
|---|---|---|---|---|---|
| Compressive Strength (MPa) | | | | | |
| at 220° F. for 4 min: | | | | | |
| at molding pressure 220 psi | — | 0.2 | 0.3 | — | — |
| at 250° F. for 8 min: | | | | | |
| at molding pressure 220 psi | 10.4 | — | crack | — | — |
| at molding pressure 55 psi | — | — | — | 2.3 | — |
| at 320° F. for 4 min: | | | | | |
| at molding pressure 220 psi | — | — | crack | — | — |

3. Discussion

The mechanical properties were significantly affected by the processing conditions and moisture content of the board.

Referring to Tables 4 and 6, at 10% moisture content, 220 psi molding pressure, and 250° F. molding temperature, the compressive strength of the board was about 13.6 MPa (when pressed for 4 minutes) and about 10.4 MPa (when pressed for 8 minutes). However, when a board having a 20% moisture content was pressed at 220° F. and 220 psi, for 8 minutes, the board cracked (Table 6). Furthermore, at higher moisture contents of 30% by weight, the molding pressure had to be reduced to 55 psi to obtain a board that did not crack. However, the compressive strength of this board was only 2.3 MPa (Table 6), which is insufficient for feed packaging applications.

The interactions between the moisture content and molding pressures and temperatures are very important. At high moisture contents and high molding temperatures and pressures, the samples exhibited defects (such as cracks) due to the fast water transfer rate from the center to the surface. At low molding pressures and temperatures, however, the compressive strength of the samples was too low to be suitable for packaging applications.

Example 3

A biodegradable and edible mixture comprising fiber and adhesive was prepared as described in Part 1 of Example 1 above except that, rather than compressing the mixture into a board, it was compressed into the shape of a barrel without a bottom using a laboratory scale mold prepared particularly for this purpose. Referring to FIG. 1, the mold apparatus 10 includes a stationary cylindrical assembly 12 and a cylindrical assembly 14. Assembly 12 includes upper stationary cylinder section 16 and lower stationary cylinder section 18. Section 18 has a flat base 20, a cylindrical tapered mold surface 24, and an inside guide cylinder 26. Section 16 includes a sidewall 28. Mold surface 24 acts as a guide for sidewall 28 of section 16 as it is lowered to base 20 during pressing.

Assembly 14 includes an outer stationary cylinder 36, an inner cylinder 38 positioned within cylinder 36, and a center ram cylinder 40 positioned between cylinders 36, 38. Cylinders 38, 40 are shiftable relative to cylinder 36. Cylinder 38 includes a tapered cylindrical mold portion 41 secured to end 42 of cylinder 38. During use, cylinder 36 is secured to sidewall 28 of section 16 by way of screws 44 which pass through screw openings in respective flanges 46, 48 of sidewall 28 and cylinder 36.

In forming the barrel used in this example, cylinder 36 was separated from sections 16, 18. Next, 360 grams of the mixture was placed within an opening 50 created by mold surface 24 and inside guide cylinder 26, so that the mixture filled the opening 50 to a level approximately adjacent the top end 52 of cylinder 26. Cylinder 38 was then placed within apparatus 10 so that mold portion 41 was positioned between cylinder 26 and sidewall 28 and between cylinder 26 and surface 24. Stationary outside cylinder 36 was then secured to sidewall 28 by way of screws 44, and the center ram cylinder 40 was inserted between inside cylinder 38 and outside cylinder 36. A hydraulic press (not shown) was operatively coupled to cylinder 40, and cylinder 40 was subjected to pressure by the press. When the top portion of cylinder 40 was approximately adjacent the top portion of cylinder 38, both cylinders 38, 40 were subjected to heat (about 120° C.) and pressure (about 300–350 psi) by the press for approximately 10 minutes. The apparatus 10 was then disassembled, and the formed barrel sidewall 54 was removed from the mold portion 41.

The bottom portion (not shown) of the barrel was formed by pressing the same mixture into a flat, circular panel. The press conditions were 290° F. and 333 psi for 6 minutes. The panel thickness was from about 0.375 to 0.5 inches, with the panel having a density similar to that of the barrel. A recessed area was machined into the panel around its perimeter. The recessed area had the same diameter and width as the bottom edge of sidewall 54 (i.e., at the smaller end of the barrel). This bottom portion was then secured to sidewall 54 by placing sidewall 54 within the recessed area on the bottom portion.

The formed lab-scale barrel specimens were then tested for their compressive strength. The testing procedures followed were the same as for the boards described in Example 1. These test results were used to estimate the maximum load strength of the barrel when produced at commercial scale. Three replicates of these tests were conducted.

The physical dimensions of the barrel are set forth in Table 7. Various tests were conducted on the barrel. The maximum compressive strength of the barrel was about 283 kg (623 lbs.) with a displacement of 1.6. Based on this result, the projected maximum compression load of a commercial size barrel would be approximately 990 kg (2100 lbs.). In animal supplement gel applications, this would allow the barrels to be stacked five high with a 50% safety factor, which is strong enough to support the static load from the gel in four containers. While the molding time of the lab-scaled barrel was about 10 minutes, commercial molding equipment would likely reduce the molding time to about 3–5 minutes.

While the illustrated mold apparatus 10 was useful for purposes of preparing a small quantity of barrels for purposes of testing, it will be appreciated that in commercial applications the molding apparatus used to produce the inventive packaging containers would be substantially different so that large quantities of the barrel could be produced economically.

TABLE 7

CYLINDER COMPRESSION RESULTS

| Barrel Dimensions | |
| --- | --- |
| Top Diameter | 6.0 inches |
| Height | 6.0 inches |
| Wall Thickness | 0.25 inches |
| Degree of Taper | 5° |
| Density | 0.0284 lb/in$^3$ |
|  | 0.786 g/cm$^3$ |
| Circumference | 18.8 inches |
| Test Conditions: | |
| Testing Machine | Instron 1120 |
| Test Type | Compression |
| Crosshead Speed | 2.54 mm/min |

Example 4

1. Preparation of Sample Boards

In this example, tests were conducted to determine the effect of the moisture content of the soy/straw mixture just prior to compressing of the mixture. The three moisture levels tested were 7% by weight, 10% by weight, and 12% by weight, based upon the total weight of the mixture taken as 100% by weight. In this procedure, 2.7 g of NaOH was dissolved in 600 g of distilled water. Next, 136.4 g of soy flour (obtained from Cargill, Cedar Rapids, Iowa) was mixed with the NaOH solution until the flour was uniformly dispersed in the solution. The slurry was then blended with 1000 g of ground wheat straw in order to achieve a uniform coating of the slurry over the straw. The resulting mixture was then dried to the desired moisture content. Finally, about 120 g of the dried mixture was compressively molded into 6" by 6" flat boards at a molding pressure of 333 psi and a molding temperature of 390° F. for about 5 minutes. The resultant boards were about 0.25" thick.

2. Quality Evaluation of Sample Boards

Mechanical property tests were conducted on the boards as set forth in Part 2(a) of Example 1. The thickness swell of the sample boards was determined following the stability test set forth in Part 2(b) of Example 1.

3. Results and Discussion

Table 8 sets forth the results from these tests. As the data clearly indicates, the moisture content of the soy straw just prior to compressive molding of the mixture has a significant effect on the composite's physical properties. These results, along with the results of Example 2, indicate that there is an optimum moisture content which maximizes the composite's physical properties. At high moisture contents, the composite will crack when the molding pressure is removed. As the moisture content decreases below the optimum level, the composite's physical properties will likewise decrease, as appears to have been the case in Example 1.

TABLE 8

Bending properties and dimensional stability of the soy/straw composites with varying moisture contents

| Sample Moisture Content[a] | MOR (MPa) max ±2 | MOE (MPa) max ±400 | Thickness Swell (%) max ±4 |
|---|---|---|---|
| 7% | 13.7 | 2190 | 35.6 |
| 10% | 20.1 | 3370 | 22.5 |
| 12% | 21.3 | 3110 | 8.5 |

[a]In percent by weight, based upon the total weight of the mixture taken as 100% by weight.

Example 5

1. Preparation of Sample Boards

In this Example, three soy/straw composite formulas having varying amounts of NaOH modifier were tested. The amounts of NaOH modifier utilized were 0.0 g, 5.3 g, and 10.4 g, which correspond respectively to 0.0%, 2.0%, and 4.0% by weight NaOH, based on the total weight of soy flour in the composite taken as 100% by weight. The NaOH was dissolved in 1000 g of distilled water followed by mixing of 265 g of soy flour (obtained from Cargill, Cedar Rapids, Iowa) with the NaOH solution until the flour was uniformly dispersed in the solution. The resulting slurry was then blended with 1500 g of ground wheat straw in order to obtain a uniform coating of the dispersion over the straw. The mixture was dried to a moisture content of 11% by weight, based upon the total weight of the mixture taken as 100% by weight. Finally, about 120 g of the dried mixture was compressively molded into 6" by 6" flat boards at a molding pressure of 333 psi and a molding temperature of 293° F. for about 5 minutes. The resultant boards were approximately 0.25" thick. Each of the test formulas had a final make-up of about 15% soybean flour, 74% wheat straw, and 11% water (all percents being by weight).

2. Quality Evaluation of Sample Boards

Mechanical property tests were conducted on the boards as set forth in Part 2(a) of Example 1. The thickness swell of the sample boards was determined following the stability test set forth in Part 2(b) of Example 1.

3. Results and Discussion

Table 9 sets forth the properties measured in this example. The data indicates that the NaOH protein modifier does not increase the physical properties of the soy/straw composite in a 3-point bend test, nor does the NaOH affect the dimensional stability of the samples. Furthermore, the composite with no NaOH modifier had a higher bending strength and was more rigid than the samples with the modifier. However, it is not believed that the NaOH modifier actually reduces the composite's strength or rigidity, since other experiments have shown the physical properties of the composites to be essentially equal with or without the NaOH modifier.

TABLE 9

Bending properties and dimensional stability of soy/straw composites with varying levels of NaOH protein modifier.

| Sample[a] | MOR (MPa) max ±2 | MOE (MPa) max ±400 | Thickness Swell max ±4 |
|---|---|---|---|
| 0.0% NaOH | 26.0 | 3440 | 22.1 |
| 2.0% NaOH | 23.4 | 3280 | 21.7 |
| 4.0% NaOH | 22.7 | 2580 | 20.0 |

[a]In percent by weight, based upon the total weight of the soy flour taken as 100% by weight.

We claim:

1. A biodegradable and edible composite in the form of a self-sustaining body formed from a mixture comprising an adhesive and a quantity of fiber, said fiber derived from straw, the ratio of fiber solids to adhesive solids in said mixture being from 4:1 to 20:1, and said body having an ASTM D1037-93 compressive strength of at least about 5 MPa.

2. The composite of claim 1, wherein said fiber is derived from a fiber source selected from the group consisting of straw, corn stalks, sorghum stalks, soybean hulls, peanut hulls, fibers derived from grain milling by-products, and mixtures thereof.

3. The composite of claim 1, wherein the moisture content of said mixture prior to the forming of said body is less than about 20% by weight, based upon the total weight of the mixture taken as 100% by weight.

4. The composite of claim 1, wherein the moisture content of said body is less than about 10% by weight, based upon the total weight of the body taken as 100% by weight.

5. The composite of claim 1, wherein said body is essentially free of preservatives.

6. The composite of claim 1, said body including an outer surface and further including a moisture barrier applied to said outer surface.

7. The composite of claim 6, wherein said moisture barrier comprises a wax.

8. The composite of claim 1, wherein said composite is in the form of a container comprising abase and upright sidewalls, said sidewalls presenting an opening and said container further including a quantity of an animal feed in said opening.

9. The composite of claim 1, wherein said adhesive is formed by reacting in an aqueous system a component selected from the group consisting of flours, starches, and proteins, with a modifier selected from the group consisting of:

(1) alkaline materials;

(2) saturated and unsaturated alkali metal $C_8$–$C_{22}$ sulfate and sulfonate salts;

(3) compounds having the formula I:

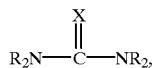

wherein each R is individually selected from the group consisting of H and $C_1$–$C_4$ saturated and unsaturated groups, and X is selected from the group consisting of O, NH, and S; and (4) mixtures of (1), (2), and (3), wherein said flour comprises at least about 25% by weight protein.

10. The composite of claim 9, wherein said component is a protein selected from the group consisting of soybean protein, wheat protein, corn protein, sorghum protein, and mixtures thereof.

11. The composite of claim 9, wherein said component is a protein and the quantity of protein utilized to form said adhesive is at least about 5% by weight, based upon the total weight of the mixture taken as 100% by weight.

12. The composite of claim 9, wherein said modifier is selected from the group consisting of NaOH, urea, sodium dodecyl sulfate, sodium dodecylbenzene sulfonate, guanidine hydrochloride, and mixtures thereof.

13. A biodegradable and edible composite in the form of a self-sustaining body formed from a mixture comprising an adhesive and a quantity of fiber derived from a source selected from the group consisting of straw, corn stalks, sorghum stalks, and mixtures thereof, the ratio of fiber solids to adhesive solids in said mixture being from about 2.5:1 to about 20:1, and said body having an ASTM D1037-93 compressive strength of at least about 5 MPa.

14. The composite of claim 13, wherein the moisture content of said mixture prior to the forming of said body is less than about 20% by weight, based upon the total weight of the mixture taken as 100% by weight.

15. The composite of claim 13, wherein the moisture content of said body is less than about 10% by weight, based upon the total weight of the body taken as 100% by weight.

16. The composite of claim 13, wherein said body is essentially free of preservatives.

17. The composite of claim 13, said body including an outer surface and further including a moisture barrier applied to said outer surface.

18. The composite of claim 17, wherein said moisture barrier comprises a wax.

19. The composite of claim 13, wherein said composite is in the form of a container comprising a base and upright sidewalls, said sidewalls presenting an opening and said container further including a quantity of an animal feed in said opening.

20. The composite of claim 13, wherein said adhesive is formed by reacting in an aqueous system a component selected from the group consisting of flours, starches, and proteins, with a modifiers elected from the group consisting of:

(1) alkaline materials;

(2) saturated and unsaturated alkali metal $C_8$–$C_{22}$ sulfate and sulfonate salts;

(3) compounds having the formula I:

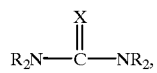

wherein each R is individually selected from the group consisting of H and $C_1$–$C_4$ saturated and unsaturated groups, and X is selected from the group consisting of O, NH, and S; and (4) mixtures of (1), (2), and (3), wherein said flour comprises at least about 25% by weight protein.

21. The composite of claim 13, the particle size of the fiber being such that less than about 10% of the particles have a particle size of less than about 678 μm.

22. The composite of claim 1, the particle size of the fiber being such that less than about 10% of the particles have a particle size of less than about 678 μm.

* * * * *

UNITED STATES PATENT AND TRADEMARK OFFICE
Certificate

Patent No. 6,337,097 B1                                          Patented: January 8, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Xiuzhi S. Sun, Manhattan, KS; Paul Seib, Manhattan, KS; Greggory S. Karr, Manhattan, KS; and James Drouillard, Manhattan, KS.

Signed and Sealed this Twenty-fourth Day of June 2003.

MARIAN C. KNODE
*Supervisory Patent Examiner*
Art Unit 1700